United States Patent
Roth et al.

(10) Patent No.: US 7,614,063 B2
(45) Date of Patent: Nov. 3, 2009

(54) DEVICE FOR ALIGNING A DATA CARRIER PLATE WITH RESPECT TO A DATA TRANSMISSION HEAD

(75) Inventors: Karsten Roth, Ehringhausen (DE); Christian Hopf, Wetzlar (DE)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 939 days.

(21) Appl. No.: 10/536,225

(22) PCT Filed: Nov. 19, 2003

(86) PCT No.: PCT/IB03/05237
§ 371 (c)(1),
(2), (4) Date: May 24, 2005

(87) PCT Pub. No.: WO2004/049322
PCT Pub. Date: Jun. 10, 2004

(65) Prior Publication Data
US 2006/0133253 A1    Jun. 22, 2006

(30) Foreign Application Priority Data
Nov. 27, 2002  (DE) ................ 102 55 259

(51) Int. Cl.
*G11B 7/085* (2006.01)
(52) U.S. Cl. .................................. 720/674
(58) Field of Classification Search ......... 720/674–677; 369/249.1, 219.1
See application file for complete search history.

(56) References Cited

U.S. PATENT DOCUMENTS

| | | | | |
|---|---|---|---|---|
| 5,657,303 A | * | 8/1997 | Namoto et al. | 369/44.32 |
| 5,764,618 A | * | 6/1998 | Kim | 720/675 |
| 5,768,248 A | * | 6/1998 | Lee | 720/675 |
| 5,995,478 A | * | 11/1999 | Park | 720/675 |
| 6,044,057 A | * | 3/2000 | Park et al. | 720/675 |
| 6,137,765 A | | 10/2000 | Saito et al. | |
| 6,414,934 B1 | * | 7/2002 | Akiba | 720/675 |
| 6,639,891 B1 | * | 10/2003 | Katagiri | 369/255 |
| 7,328,443 B2 | * | 2/2008 | Pan | 720/674 |
| 2002/0172137 A1 | * | 11/2002 | Min | 369/249 |
| 2004/0027977 A1 | * | 2/2004 | Kojima et al. | 369/244 |

FOREIGN PATENT DOCUMENTS

| | | |
|---|---|---|
| EP | 0709834 A1 | 5/1996 |
| EP | 0709834 B1 | 5/1996 |
| EP | 1050874 A1 | 11/2000 |

* cited by examiner

*Primary Examiner*—Brian E Miller
(74) *Attorney, Agent, or Firm*—WPAT, PC; Justin I. King

(57) ABSTRACT

The invention relates to a device for aligning a data carrier plate and its drive (11) with respect to a data transmission head in a data transmission device, in which data are read from or written into the data carrier plate by means of light rays, which data carrier plate is arranged with its drive on a carrier (10) which can be aligned with respect to the data transmission head and for this purpose comprises adjustment locations (12, 13, 14) which cooperate with adjustment members (15, 17) and thus define adjustment distances, wherein one of the adjustment members (15) acts on an associated adjustment location (12) on the carrier (10) so as to modify its adjustment, and the contact rods (2) comprise adjustment locations (13, 14) formed by surface deformations in contact regions (8), which adjustment locations (13, 14) cooperate in an adjustment-modifying manner with adjustment members (17) contacting said adjustment locations (13, 14).

5 Claims, 1 Drawing Sheet

Figure 1:
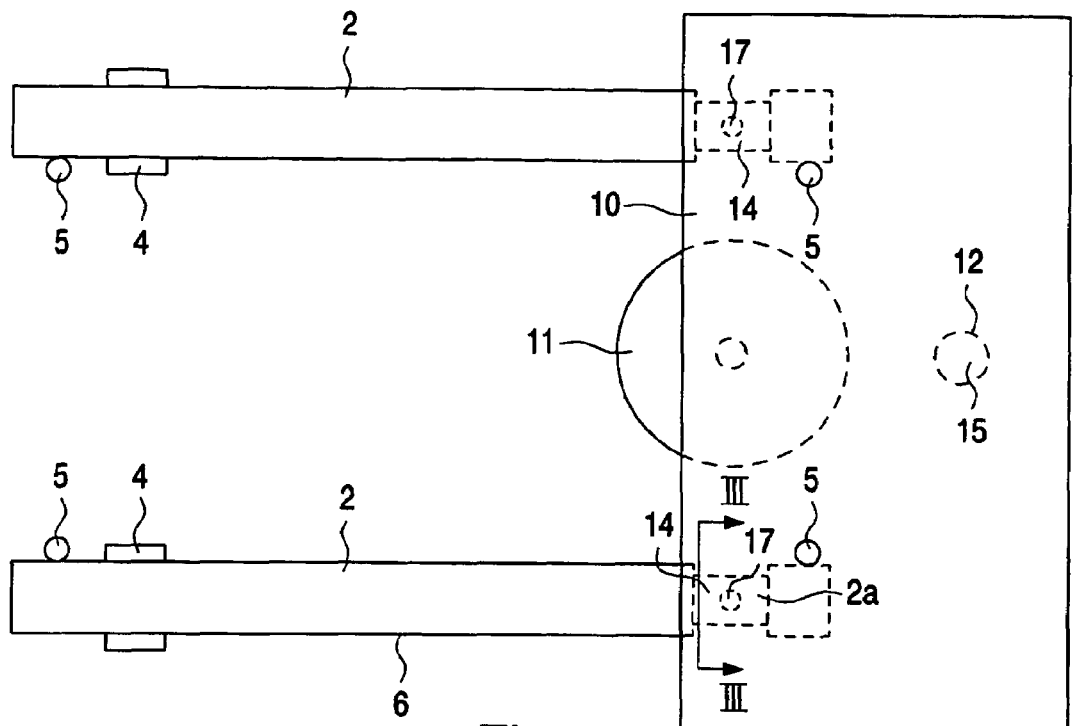

DEVICE FOR ALIGNING A DATA CARRIER PLATE WITH RESPECT TO A DATA TRANSMISSION HEAD

The invention relates to a device for aligning a data carrier plate and its drive with respect to a data transmission head in a data transmission device, in which data are read from or written into the data carrier plate by means of light rays, which data carrier plate is arranged with its drive on a carrier which can be aligned with respect to the data transmission head and for this purpose comprises adjustment locations which cooperate with adjustment members and thus define adjustment distances. The device is particularly suitable for devices of planar construction, the so-termed slim construction, such as, for example, navigation devices in motor vehicles or handheld devices.

It is known to arrange the drive of a digital data carrier plate on a planar carrier which can be adjusted with respect to a digital data transmission head. Three adjustment locations are provided on the carrier plate. Two of these adjustment locations are formed by elevations which must be manufactured to a very high accuracy so as to define a desired adjustment position with high accuracy. The adjustment locations abut against the surfaces of contact rods in the operational position, which rods are provided on the base plate of the player. The vertical positions of the adjustment locations are defined by the contact rods; they cannot be corrected anymore after being defined during mounting. The third adjustment location cooperates with a setscrew. A rotation of the setscrew changes its adjustment position with respect to the associated adjustment location.

It was found that this adjustment of the carrier plate is unsatisfactory owing to tolerances. There is no possibility for a full adjustment correction afterwards.

It is an object of the invention to improve the adjustment possibility of the carrier plate with the data carrier plate supported thereby and the plate drive with respect to the data transmission head. This object is achieved in a device having the characterizing features of the first claim. If the contact rods also allow an adjustment, all adjustment points have become modifiable. This leads to a substantially more accurate alignment of the carrier with respect to the data transmission head. A known three-point adjustment is preferred.

In a further embodiment of the invention, one of the adjustment members is a threaded bolt whose position can be adjusted. The threaded bolt accommodated in the base plate acts on the one of the three adjustment locations for vertical adjustment.

In a yet further embodiment of the invention, the contact rods comprise eccentric deformations in their contact regions for the adjustment locations, which deformations have an adjustment-modifying effect when the rotational position of the respective rod is changed.

A preferred embodiment of the eccentric deformations is formed by eccentric depressions in the regions of the adjustment locations. When the contact rods are rotated, the adjustment locations will follow the surfaces of the depressions. This renders it possible to adjust the distances between the contact rods and the adjustment locations on the carrier plate.

The depressions in the contact rods can be manufactured with little extra expenditure; they achieve the above object in an elegant, effective, and simple manner.

Figure 2:
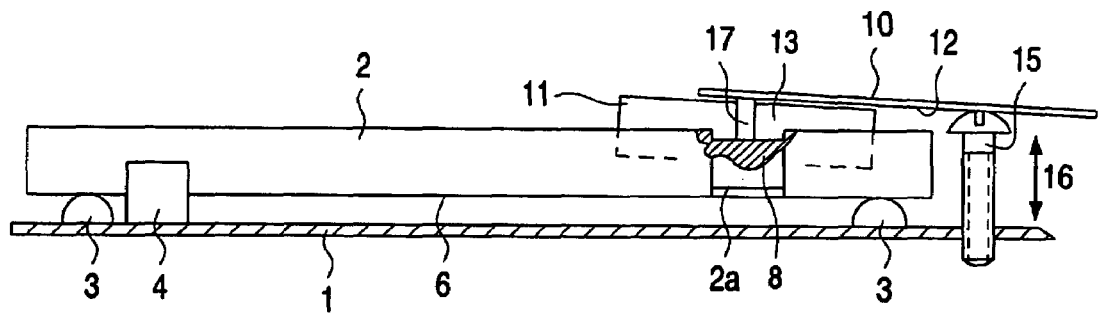
Figure 3:
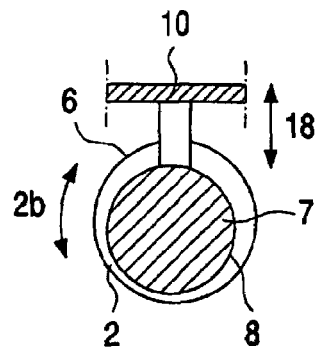

The invention will be explained in more detail below with reference to the drawing, in which:

FIG. 1 shows two contact rods and a carrier of a drive of a data carrier plate, which scans adjustment locations set for various vertical levels by means of reference pins, in plan view, FIG. 2 shows the arrangement of FIG. 1 in side elevation, and FIG. 3 is a cross-sectional view of one of the contact rods taken on the line III-III, where an eccentric depression region is clearly to be observed.

The device according to the invention is particularly suitable for appliances of planar construction, the so-called slim construction, such as, for example, navigation devices in motor vehicles or handheld devices. In such a device, contact rods 2 are provided mutually parallel on a base plate 1 shown in FIG. 2. These contact rods 2 lie on supports 3 of the base plate 1. Clamps 4 retain the contact rods 2 on the base plate 1. The distance between the contact rods 2 is determined by reference pins 5. Axial regions 2a are provided within which the rod surfaces 6 have been modified by means of depressions 7. The surfaces 8 of the depressions 7 are eccentric. The purpose of this eccentricity will be explained further below.

A planar carrier 10 supports a drive motor 11. This serves to drive a data carrier plate which is not shown. The data carrier plate is to be accurately aligned with respect to a data transmission head (not shown) such that the focused light can be directed very accurately onto write surfaces (not shown) of the data carrier plate. The planar carrier 10 is made adjustable so as to achieve this.

Three adjustment locations 12, 13, 14 are provided in the corners of a triangle. The adjustment location 12 cooperates with a tilting screw 15 acting as an adjustment member, which is adjustable in the direction of a double arrow 16 on the carrier 10 towards or away from the latter so as to adjust the vertical position of the adjustment location 12. Spacer pins 17 acting as adjustment members are provided in the adjustment locations 13 and 14, abutting against the surfaces 8 of the eccentric depressions 7.

When the rods 2 are rotated in the direction of a double arrow 2b, different surface portions of the eccentric depressions 7 will come to lie below the spacer pins 17. Said pins are lifted and lowered thereby in the direction of a double arrow 18, taking the adjustment locations 13 and 14 along with them.

The carrier 10 of the drive motor 11 and the fastenings of the data carrier plate connected thereto can thus be exactly adjusted with respect to the data transmission head, i.e. also at any time after mounting. This is of major importance for subsequent fine tuning.

The invention claimed is:

1. An aligning device for aligning a carrier with respect to a data transmission head in a data transmission device, wherein a data carrier plate and its drive are positioned on the carrier and data is read from or written into the data carrier plate by light rays of the data transmission head, the aligning device comprises:
   a plurality of contact rods comprising a plurality of contact regions formed by surface deformations of the contact rods, wherein the contact rods lie on a base plate of the data transmission device;
   a first adjustment member cooperating with an associated adjustment location on the carrier and the base plate so as to modify the position of the carrier; and a plurality of second adjustment members contacting the contact regions and the carrier;

wherein when a rotational position of the respective rod is changed, the second adjustment members abut different portions of the deformed surface of the contact regions so as to modify the position of the carrier.

2. The device as claimed in claim 1, characterized in that the first adjustment member and the second adjustment members are thee-point support of the carrier.

3. The device as claimed in claim 1, characterized in that the first adjustment member is a threaded bolt whose position can be modified.

4. The device as claimed in claim 1, characterized in that the contact rods comprise eccentric deformations in the contact regions.

5. A device as claimed in claim 4, characterized in that the eccentric deformations are formed by eccentric depressions in the contact regions.

* * * * *